V. S. PERAZIO.
HOSE COUPLING.
APPLICATION FILED JULY 8, 1910. RENEWED FEB. 9, 1912.
1,060,491.  Patented Apr. 29, 1913.
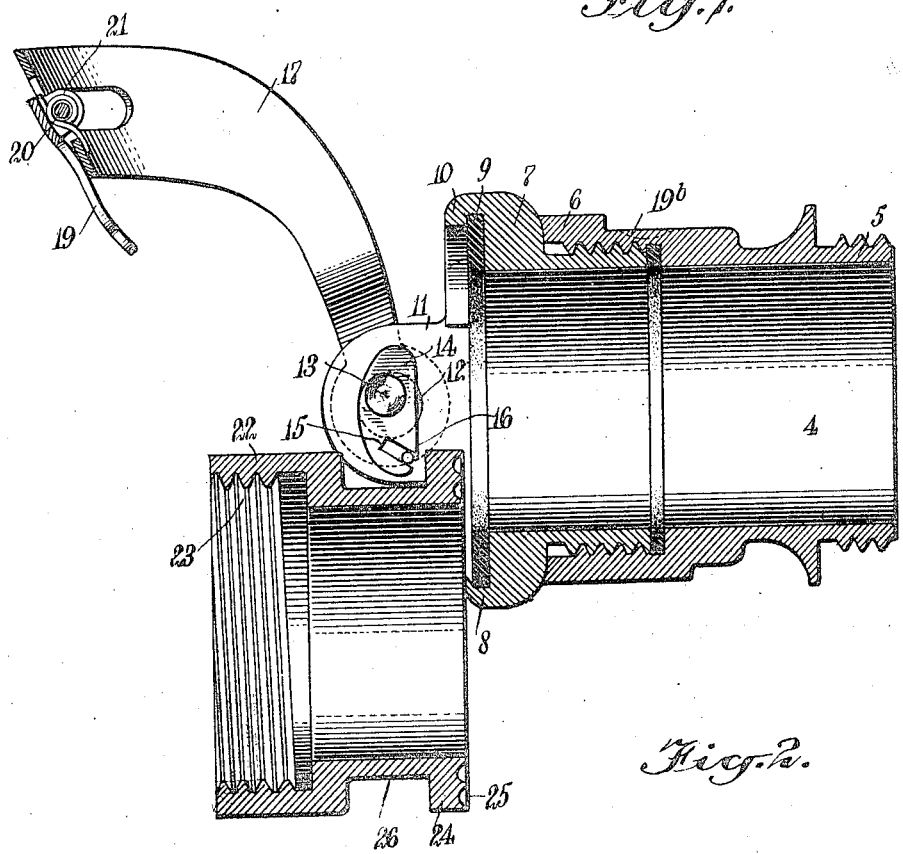
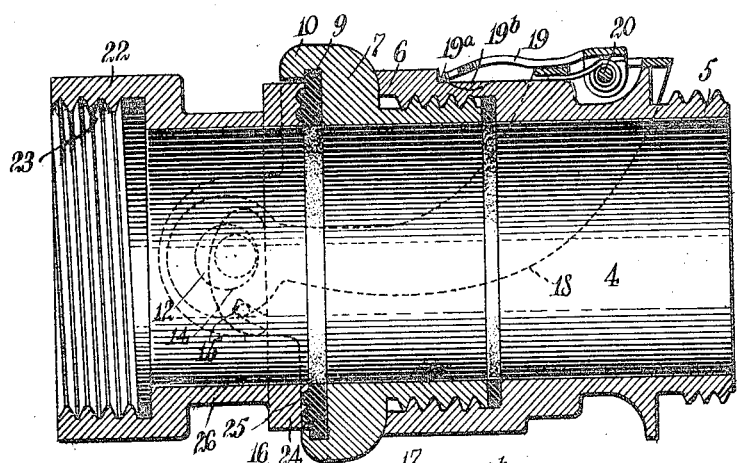
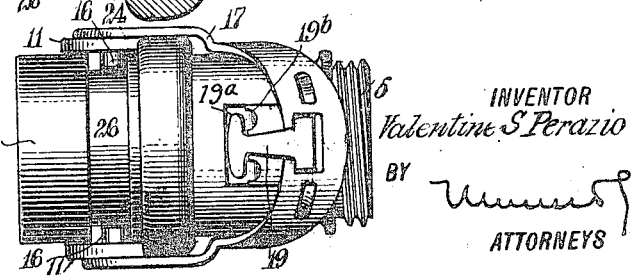
WITNESSES:
Geo. W. Naylor
Walton Harrison
INVENTOR
Valentine S. Perazio
BY
ATTORNEYS

UNITED STATES PATENT OFFICE.

VALENTINE S. PERAZIO, OF NEW YORK, N. Y.

HOSE-COUPLING.

1,060,491.

Specification of Letters Patent. Patented Apr. 29, 1913.

Application filed July 8, 1910, Serial No. 570,941. Renewed February 9, 1912. Serial No. 676,694.

*To all whom it may concern:*

Be it known that I, VALENTINE S. PERAZIO, a subject of the King of Italy, and a resident of the city of New York, borough of Manhattan, in the county and State of New York, have invented a new and Improved Hose-Coupling, of which the following is a full, clear, and exact description.

My invention relates to hose couplings, my more particular purpose being to provide a type of hose coupling suitable for use by fire departments, and of such construction that the two adjacent ends of consecutive hose sections may be quickly and securely gripped together.

My invention further relates to various details in the construction of hose couplings whereby their general efficiency is increased.

Reference is to be had to the accompanying drawings forming a part of this specification, in which similar characters of reference indicate corresponding parts in all the figures.

Figure 1 is a section through my improved hose coupling, showing the two coupling sections and the cam mechanism controllable by a lever for locking these sections together; Fig. 2 is a section showing the same parts but with the coupling sections connected; and Fig. 3 is a plan view of the mechanism shown in Fig. 2.

A tubular section 4 is provided externally with a screw thread 5 to facilitate the connection of a hose section therewith. The tubular section 4 is provided with an annular portion 6 and is threaded internally. At 7 is a head provided with a flange 8 which contains a gasket 9. The head 7 is further provided with a lip 10 having a general semi-circular form and slightly overhanging the adjacent portion of the gasket 9. The head 7 is further provided with ears 11, and extending through each ear 11 and adapted to turn therein is a disk 12 carrying a pin 13. Disposed adjacent to the two ears 11 and loosely mounted on pins 13 are two grip plates 14 each provided with a slot 15, and extending into each slot 15 is a guide pin 16 mounted rigidly upon the adjacent ear 11 whereby upon the rotation of disks 12, plates 14 are constrained to move in a direction longitudinally of the section 4 and held against rotation.

At 17 is an arm which is connected rigidly with the two disks 12 and is adapted to swing so as to turn or rock said disks. The arm 17 is of proper conformity to lie flat upon the section 4 and parts immediately adjacent to it. The section 4 is of such form that the arm 17 can lie snugly against it so as to be as far as possible out of the way under normal conditions. At 19 is a handle which is mounted upon a pivot pin 20 carried by the arm 17. A spring 21 carried by the arm 17 engages the handle 19 and normally tends to hold the handle 19 flat against the adjacent portions of the arm 17, as indicated in Fig. 1. The section 4 is provided with a shoulder 19$^a$ against which the handle 19 may lodge and serve as a pawl. The section 4 is further provided with depressions 19$^b$ into which the operator's fingers can enter in order to facilitate his grasp of the handle 19, as hereinafter described.

At 22 is a coupling section provided internally with a thread 23. The coupling section 22 carries an annular head 24, this head being provided with annular grooves 25 disposed concentrically. The section 22 is provided with an annular recess 26 partially bounding the annular head 24. By aid of the thread 23 the section 22 may be connected with a section of hose.

The operation of my device is as follows: I will suppose that the head 7 is to be connected with the head 24 so as to couple together the two hose sections. The operator grasps the handle 19 and by its aid swings the arm 17 into the position indicated in Fig. 1. The disks 12 are now in such position that the pins 13 are in their extreme positions away from the gasket 9. The operator next forces the head 24 against the gasket 9 and also against the overhanging gasket 9 of the head 7; he next turns the flange 10 of the head 7; he next turns the arm 17 over in a clockwise direction according to Fig. 1, so that the arm 17 lies as closely and neatly as possible adjacent to the section 4. The free end of the handle 19 lodges against the shoulder 19$^a$ and serves as a pawl for preventing the arm 17 from being swung outward accidentally. The turning of the arm 17 from its position indicated by full lines in Fig. 1 into that indicated by dotted lines in Fig. 2, by causing the rotation of the disks 12 also causes the grip plates 14 to move to the right and to force the annular head 24 toward the head 7 and thus grip the flange 9 forming a fluid-tight joint.

In order to uncouple the parts the operator grasps the handle 19. This is rendered easy because of the fact that the operator's fingers can enter the depressions 19$^b$. After grasping the handle 19 the operator swings it outwardly upon the pivot 20, and by pulling laterally outward from the head 24 causes the arm 17 to swing upwardly—that is, into the position indicated in Fig. 1. This releases the grip plates 14 from engagement with the annular head 24 and leaves the section 22 uncoupled from the head 7. If desired, the head 7 may be secured directly to the end of the ordinary coupling section used in connection with a hose, the part 4 being thus omitted entirely.

It will be noted that the grip plates 14 always occupy definite positions relatively to the gasket 9. That is to say, the edges of the grip plates 14 disposed toward said gasket are always parallel therewith; this is by virtue of the guide pins 16.

Having thus described my invention, I claim as new and desire to secure by Letters Patent:

1. In a hose coupling, the combination of a pair of coupling members, gripping plates carried by one of said coupling members and movable relatively to the same for the purpose of clamping one of said coupling members relatively to the other, guide pins for holding said gripping plates in predetermined positions relatively to the coupling members upon which they are mounted, and means including a swinging arm for moving said gripping plates bodily in relation to the coupling member upon which they are mounted.

2. In a hose coupling, the combination with two sections to be coupled, one of the sections being provided with ears, of disks mounted in the ears and each carrying an eccentric pin, clamping plates mounted upon the pin and each provided with a slot, pins on the ears and engaging in the slots of the clamping plates, an arm carried by the disks, and means for locking the arm in position.

3. In a hose coupling, the combination with two sections to be coupled, one of the sections being provided with a shoulder, of an arm pivoted to said section, means carried by the arm at the pivoted end thereof for clamping the sections together, a pivoted handle mounted at one end on the said arm, and a spring engaging the arm and handle to hold the handle against the arm with its free end engaging the shoulder of the section to lock the arm in position.

In testimony whereof I have signed my name to this specification in the presence of two subscribing witnesses.

VALENTINE S. PERAZIO.

Witnesses:
ALBERT HILLS,
WM. BROAD.